INVENTORS E.E. DAVIDSON
W.M. REGITZ
BY Charles Scott Phelan
ATTORNEY

Aug. 5, 1969 E. E. DAVIDSON ET AL 3,460,092

SELECTOR MATRIX CHECK CIRCUIT

Filed March 31, 1965 3 Sheets-Sheet 2

United States Patent Office 3,460,092
Patented Aug. 5, 1969

3,460,092
SELECTOR MATRIX CHECK CIRCUIT
Evan E. Davidson, Matawan, and William M. Regitz, Colonia, N.J., assignors to Bell Telephone Laboratories, Incorporated, New York, N.Y., a corporation of New York
Filed Mar. 31, 1965, Ser. No. 444,345
Int. Cl. G11c *7/00;* H03k *5/20*
U.S. Cl. 340—166 15 Claims

ABSTRACT OF THE DISCLOSURE

Faults in circuits in, or associated with, a selection matrix for a magnetic memory are detected by varistors which are connected in series in the respective matrix coordinate circuits. The varistors respond to matrix drive current by developing potential differences that are transformer coupled to signal-level responsive logic for indicating the flow of current in a varistor of a nonselected coordinate circuit.

This invention relates to data processing systems, and in particular it relates to an arrangement for checking the operation of a selection matrix associated with a memory in such a system.

In data processing systems a large memory is often employed for storing data and program instructions which control a processor. Selection matrices are often utilized to reduce the cost of access circuit hardware for coupling input-output circuits to different selectable memory locations. Such a selection matrix and the memory to which it is coupled are advantageously operated on coincident current principles. A typical coincident current memory system may include a horizontal selection matrix and a vertical selection matrix for supplying two half-select currents in coincidence for operating storage means at a selected address in the memory. Each of those selection matrices includes coordinate row and column circuits that are coupled to the memory system address translating circuits so that only one row circuit and one column circuit of each matrix are normally energized for coupling a drive current pulse to a single crosspoint load thereof. Each selection matrix crosspoint load is a coordinate drive circuit of the memory, which may, for example, be magnetic memory.

Certain faults that occur in the matrix or in the address translating circuits create a shunt current conduction path within the matrix which diverts drive current from a selected crosspoint load thereof. The shunting reduces the drive current supplied to the selected crosspoint load, i.e., the corresponding memory coordinate drive circuit. This type of faulty operation may adversely affect the operation of memory devices at the selected location. For example, it may cause plural memory locations to be selected and thereby produce an indefinite read-out from the memory or possibly destroy information in a memory location where no write-in is to be accomplished.

Selection matrices for memories in data processing systems are oftentimes not directly checked in the course of normal system maintenance routines. Some systems, however, check the matrix operation indirectly by means of a programmed sequence of operations in which the contents of certain memory locations are placed in temporary storage while special test words are written into their memory locations and thereafter read out for comparison with known data. The comparing operation is designed to indicate whether or not there has been faulty writing or reading in the memory as a result of one or more faults in the selection matrices. After the mentioned maintenance operations have been completed the temporarily stored data is replaced in the memory. This type of maintenance surveillance of a memory and its access circuits requires a great deal of processor time, and it must be repeated at regular intervals in order to insure the integrity of the memory. After a fault has been detected, the appropriate equipment must be taken out of service and further programmed test routines accomplished in order to identify the particular part of the equipment which requires service.

It is therefore one object of the present invention to reduce the amount of data processor time which is required for maintenance operations associated with processor memory circuits.

Another object is to check the operation of a selection matrix by direct means which require a minimum amount of processor program time.

Still another object of the invention is to check the operation of a selection matrix on a substantially continuous basis so that faults evidenced in the operation of the matrix may be detected and isolated soon after they occur.

These and other objects of the invention are realized in an illustrative embodiment in a selection matrix for a magnetic memory by detecting the presence of a fault as evidence by the presence of current in nonselected matrix coordinates, as well as in the selected matrix coordinates. Separate impedance devices are coupled to the respective coordinate circuits of a matrix and utilized to indicate a division of drive current. In one particular embodiment of the invention the impedances are resistive means connected in series in the respective coordinate circuits. The potentials developed across all such resistive means are transformer coupled to logical connections for actuating a detector circuit. If drive current flows in the resistive means of a nonselected matrix coordinate circuit, the detector indicates the occurrence of a fault.

A salient feature of one embodiment of the invention is that the resistive means are advantageously varistors which cooperate with the transformers to produce in a series loop circuit, including secondary windings of all of the transformers, a uniform voltage for every coordinate circuit conducting at least a predetermined minimum amount of drive current. The various loop voltages are advantageously offset against one another to facilitate the development of the fault indication.

A further feature is that the coordinate circuit resistance arrangement detects a matrix fault at a nonselected matrix crosspoint which is associated with a selected coordinate circuit of the matrix.

Another feature is that the selection matrix coordinate resistance arrangement automatically monitors the operation of both the selection matrix and the memory system address translation circuits coupled to such matrix.

A further feature is that the matrix is tested during each read or write operation of the memory by the application of normal matrix operating signals, and the test results are independent of the character of the read-out from the associated memory array.

Still another feature of the invention is that the coordinate circuit varistors have turn-on current requirements which are satisfied by currents that are very much smaller than the memory half-select current supplied to an associated memory by the matrix.

A further feature is that the coordinate varistor arrangement for selection matrices is dependent upon the type of impedance network which a selection matrix presents to its drive current source regardless of the magnitude of the output current from such source.

Yet another feature is that the use of resistive matrix coordinate impedances to check for matrix faults does not appreciably affect the configuration of matrix drive current pulses.

The aforementioned features and objects of the invention as well as other features and objects will be better understood upon a consideration of the following detailed description and the appended claims in connection with the attached drawing of an illustrative embodiment in which:

Figure 1:
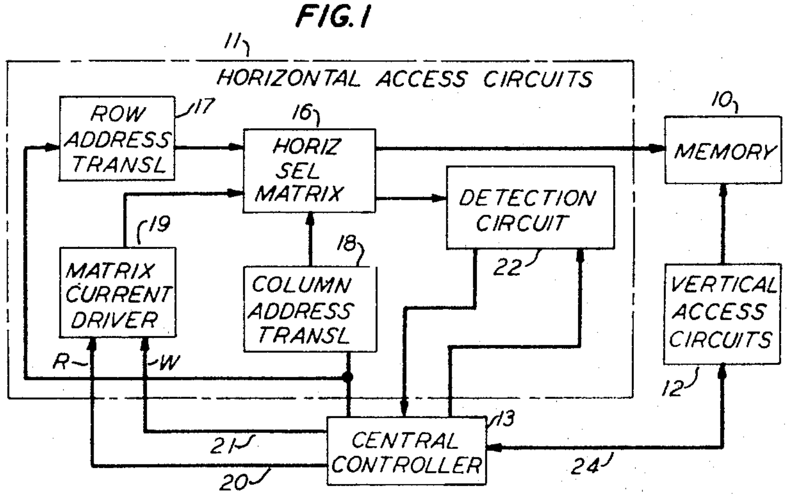
FIG. 1 is a simplified block and line diagram of a data processing system utilizing the present invention.

The data processing system illustrated in FIG. 1 includes a coincident current magnetic memory 10 which is provided with horizontal access circuits 11 and vertical access circuits 12. The access circuits 11 and 12 supply half-select drive signals to selectable memory addresses in response to address and control information signals as is well known in the art. Since the access circuits 11 and 12 are essentially the same, only the horizontal circuit 11 is illustrated in detail. The address and control signals are supplied by a central controller 13 for the data processing system. The controller 13 is advantageously a stored program data processor, many forms of which are well known in the art.

Figure 2:
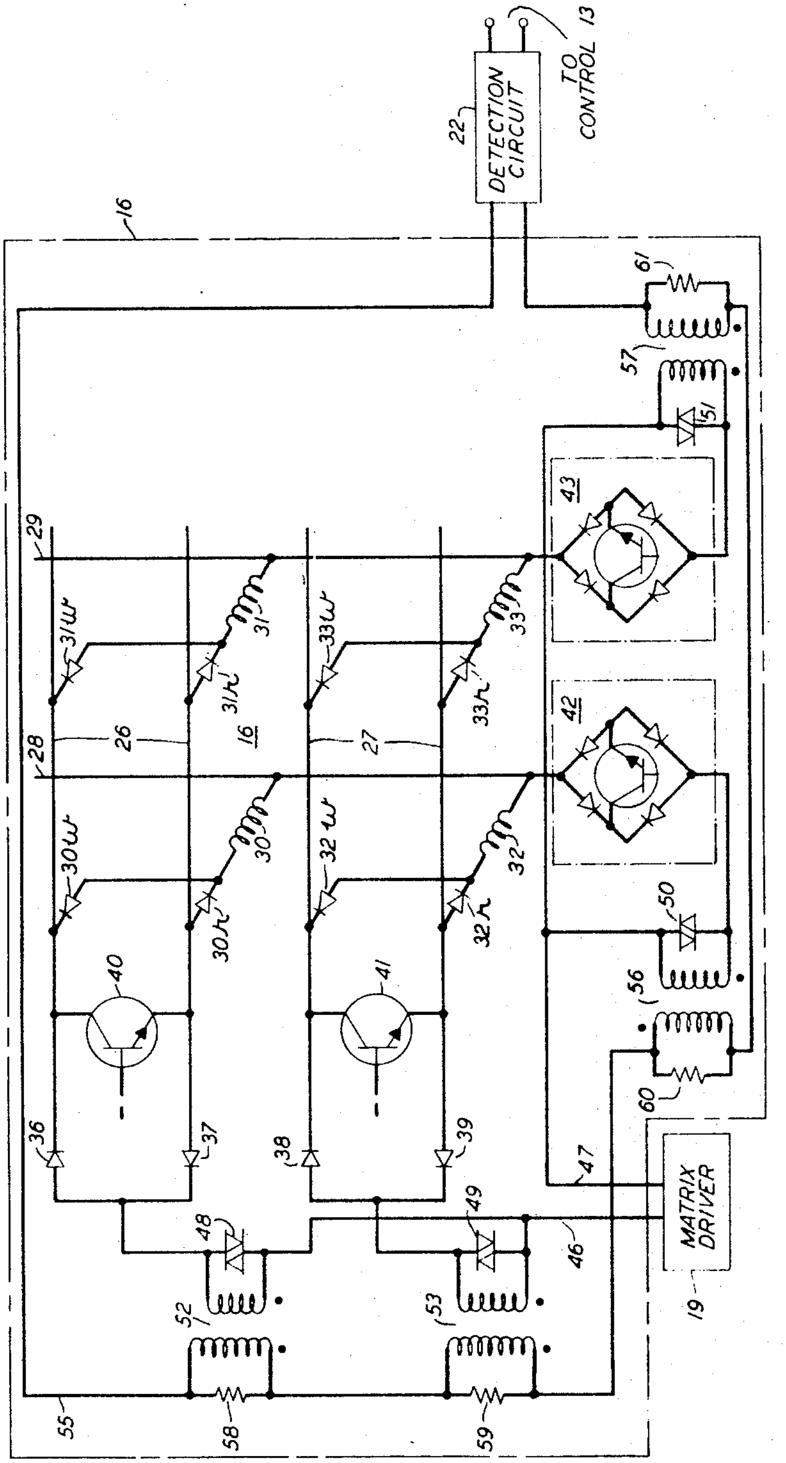
FIG. 2 is a schematic diagram of a typical selection matrix utilizing the present invention.

The horizontal access circuits 11 include a horizontal selection matrix 16 which is illustrated in detail in FIG. 2. Address information from central controller 13 is supplied to the matrix 16 through a row address translator 17 and a column address translator 18 of a type well known in the art. The translators convert binary coded addresses to one-out-of-*n* type coding for actuating a selection matrix. The address translators enable a particular row and column of the selection matrix 16 to receive drive current pulses which are supplied from a matrix current driver 19. The driver 19 receives read and write actuating signals from the central controller 13 by means of a read circuit 20 and a write circuit 21. Alternatively, in destructive readout systems controller 13 may supply only a read control signal, and the write control is automatically internally generated in driver 19. Driver 19 supplies read and write signals of opposite polarities to matrix 16, and the magnitudes of those pulses are sufficient to couple half-select signals to row circuits of memory 10. Matrix checking impedances in matrix 16 provide signals to a detection circuit 22 which indicates the occurrence of a fault as will be described in connection with FIG. 2. The circuit 22 provides an appropriate indication of the fault to central controller 13.

Vertical access circuit 12 are similar to the horizontal circuits 11 in arrangement and operation for supplying half-select drive signals, as in FIG. 2, to a selected column circuit of memory 10. A bidirectional connection 24 in FIG. 1 schematically represents all of the connections between controller 13 and the circuits 12.

FIG. 2 includes a circuit diagram in simplified form of the horizontal selection matrix 16. The matrix includes two row circuits 26 and 27 and two column circuits 28 and 29. Only two row circuits and two column circuits are illustrated since they are all that are required to illustrate the principles of the invention. However, those principles are also useful in connection with much larger matrices.

A plurality of crosspoint loads 30, 31, 32, and 33 are provided; and each such load interconnects a different combination of one of the row circuits and one of the column circuits. Each of the crosspoint loads for the horizontal selection matrix 16 is a different horizontal drive circuit for the coincident current magnetic memory 10. Each matrix row circuit includes a separate conductor for positive and negative signals which are conducted thereto by steering diodes such as the diodes 36 and 37 in row circuit 26 and the diodes 38 and 39 for row circuit 27.

One terminal of each crosspoint load is connected to a column circuit directly, and the other terminal of the crosspoint load is connected through a pair of oppositely poled diodes to the two portions of the associated row circuit. Thus, the crosspoint load 30 has one terminal connected directly to column 28, and its other terminal is connected through the diodes **30*r* and 30*w* to the read and write portions, respectively, of the row circuit 26**. Similar connections are provided for each of the other crosspoint loads.

Each pair of diodes which is connected directly to a crosspoint load cooperates with the steering diodes of the associated row circuit to form a diode bridge gate. In the row 26 the steering diodes 36 and 37 form such a gate with the crosspoint load diodes **30*w* and 30*r* for load 30 and with the corresponding diodes of the load 31. Such gates are enabled or disabled in accordance with the conducting or nonconducting condition of a transistor 40 which has its collector-emitter electrode path connected across one diagonal of such bridge. The base electrode of transistor 40 receives signals from the output of the row address translator 17 of FIG. 1. A similarly connected transistor 41 on row circuit 27 also receives signals from the translator 17. If such a gate transistor is biased to be conducting, input drive signals can be applied through its bridge to its corresponding row circuits. However, if the gate transistor is nonconducting the row circuit is disabled for the reception of input signals. The bridge circuits permit drive signals to be either positive or negative. Similar gate circuits 42 and 43 are provided in series in the column circuits 28 and 29, respectively, and their gate enabling transistors receive enabling signals from the column address translator 18**. Thus, the translator output enable one coordinate row circuit and one coordinate column circuit for the reception of drive signals to energize the crosspoint load which is connected between such coordinate circuits.

The matrix driver 19 has first and second output connections 46 and 47 for applying drive current pulses to coordinate circuits of the matrix 16. These pulses are of alternate positive and negative polarities for accomplishing alternate read and write operations, respectively, in the memory 10. The connection 46 is coupled in multiple to all of the matrix row circuits; and, in the individual row circuits, a varistor is included in series between the circuit 46 and the steering diodes of the corresponding row circuit. The varistor 48 is connected in row circuit 26, and the varistor 49 is connected in row circuit 27. In like manner the driver connection 47 is coupled in multiple to the column circuits by means of varistors 50 and 51 in the respective column circuits.

The varistors 48 through 51 comprise resistive impedances in the individual matrix coordinate circuits for developing potential differences to indicate the presence of drive pulse current in the corresponding coordinate circuit. Each varistor advantageously has a turn-on current which is substantially less than the normal memory half-select current magnitude provided by driver 19 to the matrix 16. Once a varistor has been turned on, it has a substantially uniform potential difference thereacross for a large range of currents in excess of the minimum turn-on current. For example, in one matrix wherein the matrix driver provided half-select current pulses of 250-milliampere magnitude to the matrix for memory 10, only 10 milliamperes were required to turn on a varistor; and the varistor displayed substantially uniform potential differences for current flows in the range of approximately 10 to 500 milliamperes.

Separate pulse transformers 52, 53, 56, and 57 are associated with the varistors 48 through 51, respectively. In each case the transformer primary winding is connected between the terminals of its associated varistor and the secondary windings of all of the transformers are connected in a series loop circuit 55 which includes the input to the detection circuit 22. Those secondary windings comprise a logical connection for actuating circuit 22 under certain signal conditions to be described. Plural resistors 58, 59, 60, and 61 are connected across the secondary windings of the transformers 52, 53, 56 and 57, respectively. These resistors are provided to prevent the loop circuit 55 from unduly loading the various transformer circuits. In addition, the resistors all have similar resistance magnitudes which are adapted to reflect adequate resistance into the primary winding of the associated transformer to be certain that the predetermined minimum coordinate circuit current will develop an adequate potential in the primary circuit to turn on the associated varistor. However, the total series resistance of resistors 58 through 61 is much smaller than the input resistance of detector 22 so that an adequate potential is developed there by a fault condition to actuate the detector.

The windings of transformers 52 and 53 are similarly polarized as indicated by the winding dot convention illustrated in FIG. 2. The windings of transformers 56 and 57 are also similarly polarized, but the column transformer secondary windings are oppositely poled with respect to the row circuit secondary windings within the series loop circuit 55. Thus, the transformers couple the potential differences developed across coordinate circuit varistors to the loop circuit 55 and the detection circuit 22. The transformer windings are arranged to offset each row circuit potential thus derived against a corresponding column circuit potential. In the absence of a fault there is no substantial net signal developed in circuit 55, but a fault causes more than one row circuit or more than one column circuit to be energized and thereby produce a net signal in loop circuit 55 to actuate the detection circuit 22.

Two factors of some significance can be noted with regard to the coordinate circuit varistors. A first one is that once a varistor has been turned on further increases in the magnitude of the drive current pulse flowing therethrough are substantially unaffected by the inductive effect of the shunting transformer winding. The total effect of the transformers and the varistors in the drive circuits is such that they impose no significant additional design requirements upon driver 19 beyond the normal requirements for driving memory 10. The second factor of note is that the voltage limiting effect of each varistor in its transformer circuit produces substantially the same indicating potential difference across the transformer secondary winding so that such secondary voltages for row and column circuits may be conveniently offset against one another.

When a row and a column circuit are enabled by the translators 17 and 18 to receive a pulse from the driver 19, such pulse turns on the two varistors associated with such row and column circuits. The resulting potential differences developed across the conducting varistors are coupled to the loop circuit 55 with opposite polarities. Accordingly, no substantial net signal is developed for actuating the detection circuit 22. However, if a fault should occur in the matrix 16, or in one of the translators 17 or 18, which provides a shunt path through a nonselected matrix coordinate circuit varistor for a portion of the output current from driver 19, one additional varistor is driven into conduction. Three potentials of equal magnitude, the two selected circuit varistors and the one additional varistor, are coupled to the loop circuit 55. Only two of the three potentials are of the same polarity, and the resulting net potential in circuit 55 actuates the detection circuit 22 to advise controller 13 that a fault has occurred.

It is, of course, mathematically possible that two faults could occur which would cause the actuation of two row varistors and two column varistors in FIG. 2 thereby producing in loop circuit 55 a net potential balance of approximately zero. That condition would indicate a no-fault condition. However, in actual practice, experience and statistical analysis have shown that there is only a negligible probability of the occurrence of simultaneous faults which would produce matrix shunt paths for operating equal numbers of varistors in more than one row circuit and more than one column circuit. Nevertheless, the circuits to be discussed in connection with FIG. 5 do indicate such faults. Some of the more typical faults which are detected by the matrix checking circuit of the invention as shown in FIG. 2 are hereinafter considered.

Assume first that when the matrix driver output connection 46 is positive with respect to the connection 47, a read drive pulse is being provided, and the reverse polarity relationship exists when a write pulse is being provided. In all of the examples hereinafter considered, it will be assumed that controller 13 has called for energization of the crosspoint load 32 so that the translators 17 and 18 must produce their one-out-of-*n* output signals for enabling row circuit 27 and column circuit 28 to receive the drive pulses.

If the translator 17 develops a fault which causes it to produce two output signals instead of the single desired output signal, both of the row transistors 40 and 41 are turned on, and read pulses from driver 19 are divided to blow through the varistors 48 and 49, steering diodes 36 and 38, transistors 40 and 41, diodes 30*r* and 32*r*, and crosspoint loads 30 and 32 to the column circuit 28. The two portions of the drive pulse are recombined in the column circuit 28 and coupled by the bridge gate 42 to the varistor 50 and back to the driver 19. Since varistors 48, 49, and 50 conduct in that situation, the two potentials developed across resistors 58 and 59 are of the same polarity and combine to more than offset the oppositely polarized potential difference developed across the resistor 60. Consequently, detection circuit 22 is activated to advise controller 13 of the *fault*.

A similar fault indication is produced if a short develops between the collector and emitter electrodes of gate transistor 40 when the address translator is operating satisfactorily. In other words, the short-circuited transistor permits the drive current pulse for both the read and the write operations to be split between the crosspoint loads 30 and 32 although both pulse portions flow together through the varistor 50.

A different type of drive current distribution occurs if the write diode 30*w* should become shorted when all other circuit elements are in satisfactory condition. In this case, and still assuming that the load 32 is the selected load, no fault would be indicated at the time of the write drive pulse. However, during the read drive pulse part of the read drive current flows in the selected row 27 and another part flows through varistor 48, steering diode 36, the shorted diode 30*w*, and load 30 to the column circuit 28. The drive current is thus split between the loads 30 and 32, and both of the row varistors 48 and 49 conduct while only the one column varistor 50 is driven into conduction. Thus, unbalanced signals appear in loop 55 to actuate detection circuit 22.

If diode 31*r* is shorted, different types of shunt paths are provided for the read and write signals, respectively. During the read pulse for the selected load 32, the read pulse splits at the emitter electrode of transistor 41; and one part flows through the selected load 32 to column circuit 28. The other part of the read pulse flows across row circuit 27 and through diode 33*r*, load 33, column circuit 29, crosspoint load 31, the shorted diode 31*r*, row circuit 26, diode 30*r*, and load 30 to the column circuit 28. Thus. the shorted diode places three crosspoint loads in a series connection across the selected crosspoint load to shunt one-third of the drive current away from the selected crosspoint load. Thus shunting is not detected, however, by the check circuit of the invention because the drive pulse splits after passing through varistor 49 and is recombined in the column circuit 28 before passing through varistor 50.

However, during the write pulse the current paths are different with the same diode 31r shorted. In this case the drive pulse circuit includes the crosspoint load 32, diode 32w, and transistor 41. However, at the emitter electrode of transistor 41 the current path splits, and the major portion of the current flows from that emitter electrode through the steering diode 39 and varistor 49 back to the driver 19. However, another part of the drive current flows from the emitter electrode of transistor 41 across row circuit 27, through diode 33r, crosspoint load 33, column circuit 29, crosspoint load 31, the shorted diode 31r, row circuit 26, steering diode 37, and varistor 48, back to the driver 19. Thus, in this case the fault places the two crosspoint loads 33 and 31 and the varistor 48 in a series connection across the varistor 49 and diode 39. Only a small portion of the drive current is thus diverted, but it is of sufficient magnitude to drive the varistor 48 into conduction and produce a fault indication in the loop circuit 55 as has been hereinafter described.

If an open circuit should occur in a drive current path, no drive current would be provided at all during at least one part of the read-write memory cycle corresponding to the polarity of the faulted circuit element. For example, such a fault could occur in the connections 46 or 47, or in a steering diode or a crosspoint diode of a selected coordinate circuit. Accordingly no signals would be coupled to loop circuit 55 and detection circuit 22 would remain inactive even though a fault had occurred. This condition can, however, be detected with a modified connection of the matrix transformer secondary windings as shown in FIG. 3.

Figure 3:
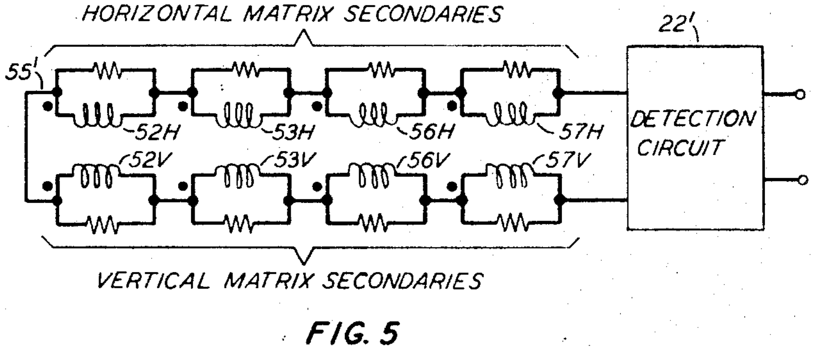
FIG. 3 is a circuit diagram of a portion of a matrix check circuit illustrating a modified form of the invention.

FIG. 3 shows a partial diagram including only the detection circuit 22′ and the secondary winding portions of the transformer circuits of horizontal selection matrix 16 and the corresponding selection matrix circuit portions of the vertical access circuits 12. All of the transformer windings for both the horizontal and vertical selection matrices are connected in a single series loop circuit 55′ across the input of a detection circuit 22′. The secondary windings 52H, 53H, 56H, and 57H in FIG. 3 are the row and column transformer secondary windings of the horizontal matrix 16; and the windings 52V, 53V, 56V, and 57V are the corresponding secondary windings of the vertical selection matrix. It will be noted from the polarity dot convention in FIG. 3 that all of the horizontal matrix secondary windings, i.e., both row and column windings, are similarly polarized in the loop circuit 55′; but they are oppositely polarized with respect to all of the vertical selection matrix secondary windings. With this arrangement two similarly polarized horizontal matrix signals are offset against two vertical matrix signals of the opposite polarity during each satisfactory matrix operation.

If a fault of the type hereinbefore discussed, except an open circuit condition, should occur in any address translator or in either matrix, an odd number of transformer circuit signals from one of the matrices would be offset against an even number of transformer circuit signals from the other matrix. The result would be a net signal in the loop 55′ to activate detection circuit 22′. When an open circuit fault occurs, no transformer circuit signals are produced in the loop circuit 55′ by the matrix associated with the open circuit, but the transformer circuits of the other matrix produce loop circuit signals in the usual manner. Since the latter signals are unopposed, they operate detection circuit 22′ and indicate the fault.

Figure 4:
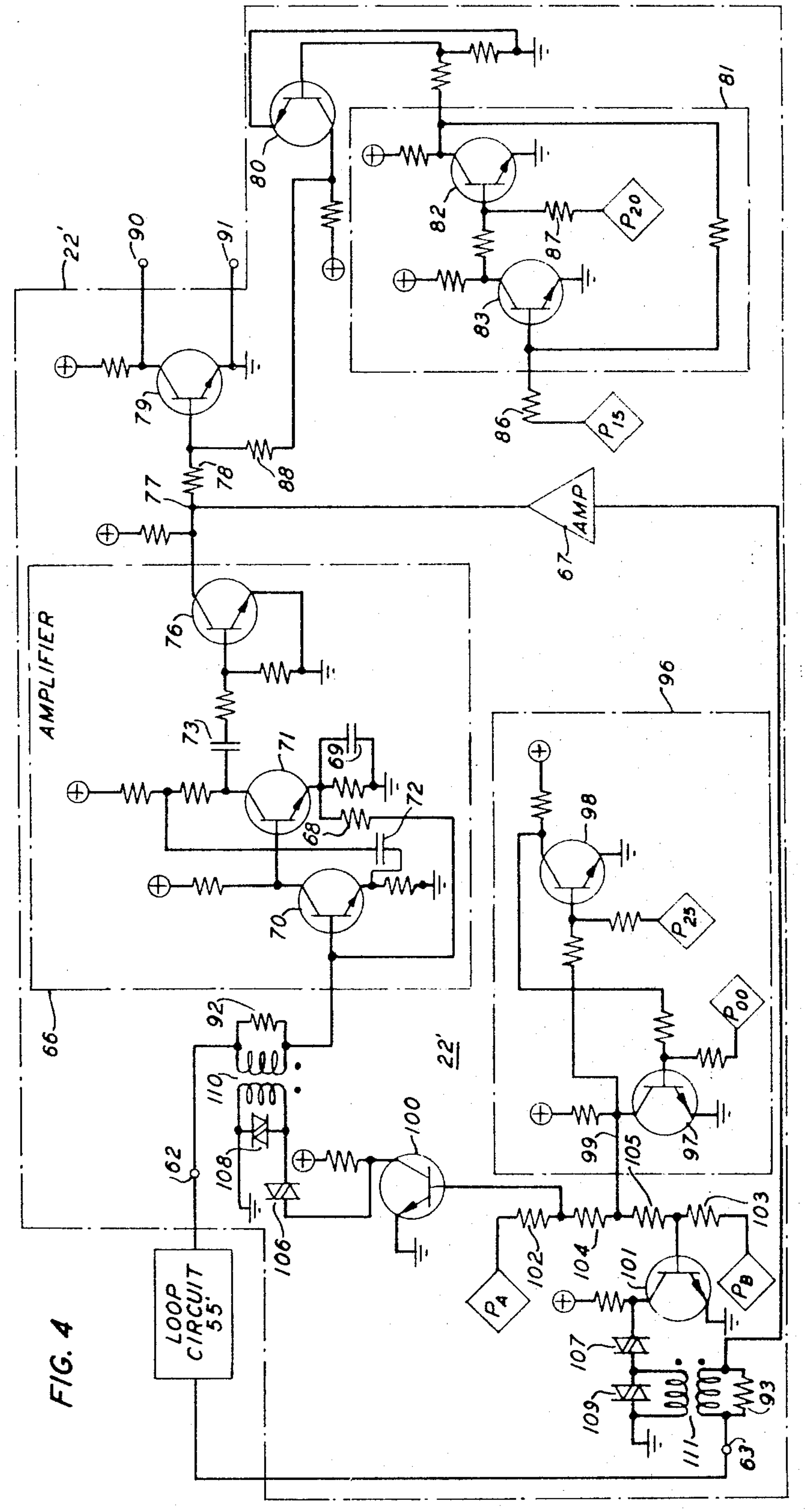
FIG. 4 is a simplified schematic diagram of a detection circuit that is advantageously employed in the invention.

In FIG. 4 is illustrated a schematic diagram of details of one form of arrangement that is advantageously used for detection circuits 22′. Substantially the same circuit is also used for detection circuit 22. Loop circuit 55′ is connected across input terminals 62 and 63 of detection circuit 22′. Each of the input terminals 62 and 63 is coupled to the input of a different one of two amplifiers 66 and 67 which are advantageously of identical configuration. Accordingly, the details of only one such amplifier, the amplifier 66, are shown in FIG. 4.

A potential difference between input terminals 62 and 63 drives a current through a resistor 68 and a bypass capacitor 69 in amplifier 66, through ground, and through the corresponding resistor and capacitor in the amplifier 67 to return to the other input terminal 63. The potential difference developed across resistor 68 in amplifier 66, in response to a loop circuit signal which makes terminal 62 positive with respect to terminal 63, drives a transistor 70 into conduction. An oppositely polarized input signal produces a similar effect in amplifier 67.

The transistor 70 is connected in a common emitter amplifier stage which is the first of two amplifier stages in the amplifier 66. The collector electrode of a transistor 70 is directly connected to the base electrode of a second stage transistor 71 to further amplify the input signal. A capacitor 72 is coupled between the collector circuit of transistor 71 and the emitter circuit of transistor 70 to provide negative feedback. Transistors 70 and 71 are normally conducting for all input signals to provide linear amplification thereof. The two-stage amplifier circuits of transistors 70 and 71 advantageously utilize operating potential sources somewhat larger than is normally required for other parts of the detection circuit in order to be certain that the amplifier transistors 70 and 71 are not driven into saturated conduction by the largest anticipated signal and noise. A capacitor 73 provides alternating current coupling for signals at the collector electrode of transistor 71 and supplies those signals to the base electrode of a transistor 76. The latter transistor is connected in a further common emitter stage that is normally nonconducting to provide threshold buffering between the input two-stage amplifier and the transistor-resistor logic circuits which follow the amplifier 66. Positive-going signals at terminal 62 are amplified in the circuits of transistors 70 and 71 to turn transistor 76 on.

The circuits of transistor 76 provide a threshold near ground. However, in some applications of the invention, e.g., in FIG. 5, a different threshold can be utilized to provide discrimination in response to the operation of a predetermined number of the matrix varistors. For example, in some applications of the embodiment of FIG. 2 it may be advantageous to have all matrix secondary windings similarly polarized and to detect faults in terms of the operation of more than two varistors.

The similar output connections of amplifiers 66 and 67 are both connected to a terminal 77 which is coupled through a resistor 78 to the base electrode of a transistor 79 that is in a further common emitter amplifier stage. The base electrode of transistor 79 is normally positively biased by positive potential from the collector circuit of a normally nonconducting transistor 80, regardless of whether or not one of the transistors 76 in amplifiers 66 and 67 is conducting. The operation of transistor 80 is controlled by a bistable multivibrator circuit 81. When transistor 80 is driven into conduction by that multivibrator, the transistor 79 is biased off if at that time one of the transistors 76 is conducting to clamp terminal 77 at ground. Otherwise transistor 79 continues to conduct.

Central controller 13 in FIG. 1 supplies program control signals to detection circuit 22 in FIG. 4. These signals are applied to circuit points bearing reference characters in a diamond indicating relative occurrence time in a program cycle for a read or a write operation. Numerical subscripts in such reference characters represent for one illustrative embodiment the relative order of initiation of positive program clock pulses in the cycle. The initial one of such pulses is designated $P_{00}$ and appears at the beginning of each read or write drive pulse to the matrix.

The bistable multivibrator 81 has the output transistor 82 thereof in a normally conducting condition. A first positive-going strobe signal $P_{15}$ from central controller 13 in FIG. 1 is applied to the base electrode of the input transistor 83 of the flip-flop circuit approximately midway during each read and write pulse to set the flip-flop. Shortly thereafter a further positive signal $P_{20}$ from controller 13 is applied through a resistor 87 to the base electrode of transistor 82 to reset multivibrator 81 and terminate the strobe signal. Thus, between those two pulses from controller 13 transistor 80 is held in a conducting condition, and the base circuit of transistor 79 is enabled to respond to signals from the amplifier 66 or the amplifier 67 as previously described.

Coincidence of ground signals at terminal 77 and at the collector electrode of transistor 80 biases transistor 79 to a nonconducting condition. In that condition a positive output signal appears at a pair of output terminals 90 and 91 for the detection circuit 22. Such output signal informs central controller 13 of the occurrence of a fault in a selection matrix or an associated address translator.

It is, of course, desirable to be able to check the operation of the detection circuit and additional circuitry is provided for this purpose in FIG. 4. Resistors 92 and 93 provide coupling between the input terminals 62 and 63 of the detection circuit and its two amplifiers 66 and 67, respectively. At predetermined intervals controller 13 causes signals to be applied across the resistors 92 and 93 to stimulate a fault signal in loop circuit 55.

A bistable multivibrator 96 controls the application of test signals and includes two transistors 97 and 98. The transistor 98 is normally conducting, and a positive output signal appears at an output lead 99 connected to the collector electrode of transistor 97. At the program time $P_{00}$ central controller 13 supplies a first positive pulse to the base electrode of transistor 97 to set multivibrator 96 and a later positive pulse at time $P_{25}$ is similarly supplied to transistor 98 to reset the multibrator. When multivibrator 96 is in its set condition ground appears on lead 99 to enable the application of programmed test signals at times $P_A$ and $P_B$ that occur in succession at predetermined longer intervals, such as once a day. The $P_A$ or $P_B$ time signal advantageously persists during at least one cycle including times $P_{00}$ and -$P_{20}$ when a system maintenance routine is in progress. These test signals are normally positive and drop to ground at $P_A$ and $P_B$, respectively, to cooperate, through resistors 102 through 105, with the ground on lead 99 to apply ground disabling signals successively to base electrodes of two transistors 100 and 101. The transistors 100 and 101 are thus caused to be biased off in succession for applying successive positive signals through two varistors 106 and 107 to transformers 110 and 111. Such signals are coupled by the transformers to resistors 92 and 93 to actuate the corresponding amplifiers. Varistors 108 and 109 limit the magnitude of the test signal applied to the amplifiers to a level substantially the same as the level of signals from circuit 55′ to simulate a fault. Thus, during such programmed test operation the operation of each of the amplifiers 66 and 67 is checked once and the operation of the flip-flop circuit 81 and the further amplifier stage of transistor 79 are also checked.

When the detection circuit of FIG. 4 is used in the embodiment of FIG. 2, additional OR logic, not shown, is provided between the output of transistor 79 and the output of the detector. Such logic permits the outputs of other circuits which monitor other parts of the access circuits to be coupled through to the one circuit 31 to controller 13. For example, circuits adapted to respond to failure of one of the drivers for access circuits 11 and 12 could supply failure indications through such OR logic and circuit 31 to the controller.

Figure 5:
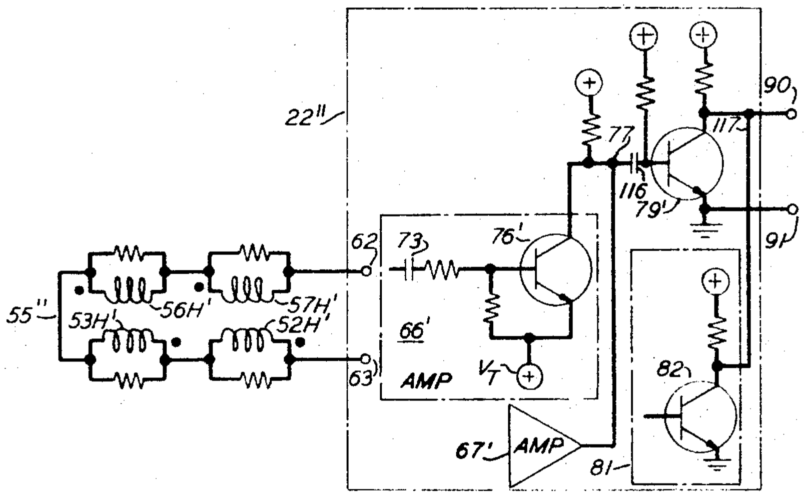
FIG. 5 is a partial diagram illustrating another modified form of the invention.

FIG. 5 shows a further embodiment of the invention in simplified partial circuit form. This embodiment is similar to the embodiment of FIG. 2. Only modified circuit portions are shown, the remainder being the same as in FIGS. 2 and 4. In FIG. 5 all transformer secondary windings 52H′, 53H′, 56H′, and 57H′ for a matrix are similarly poled in the series circuit 55″ across the input to detector 22″. The detector 22″ is modified to provide fault indications for the previously discussed fault situations with such modified transformer connections. A normal matrix operation, in the absence of a fault, causes two varistors to be actuated; and the resulting secondary winding potentials add to operate detector 22″. The latter detector is the same as the one described in FIG. 4 except for the addition of different thresholding and logic circuits to provide discrimination between predetermined magnitudes of potentials from circuit 55″. Only changed portions are illustrated in detail.

Within each of the amplifiers 66′ and 67′ the emitter circuit of transistor 76′ is returned to a positive threshold voltage source $V_t$ which normally biases the transistor 76′ off. If only two varistors in matrix secondary circuits are actuated, the signal to detector 22″ is too small to overcome the threshold, transistor 76′ remains off, and no fault is indicated. If more than two varistors are actuated, thereby indicating a fault, the threshold voltage $V_t$ is overcome; and transistor 76′ is turned on. Both of the detector amplifiers 66′ and 67′ are the same and are connected to terminal 77 as before. The negative-going signal appearing at the collector electrode of the transistor 76′ in one of the amplifiers 66′ or 67′ when more than two varistors are actuated is coupled by a capacitor 116 to transistor 79′ which is normally on. Such signal turns transistor 79′ off to provide the positive fault indication to controller 13 during the strobe interval. In FIG. 5 a lead 117 connects the output of multivibrator 81 directly to the collector electrode of transistor 79′. Consequently, the output terminal 90 of detector 22″ is normally clamped to ground as before. However, during the strobe time the transistor 82 in multivibrator 81 goes off and releases the clamp on terminal 90. That terminal can then go positive, as hereinbefore described, when the occurrence of a fault has turned transistor 79′ on.

Although the present invention has been described in connection with a particular embodiment thereof, further embodiments and modifications which will be apparent to those skilled in the art are included within the spirit and scope of the invention.

What is claimed is:

1. In combination, a source of drive signals, a network of plural individually actuatable circuit paths, a varistor connected in series in each of said paths, a plurality of transformers each having a primary winding connected across a different one of said varistors and each having a secondary winding, said secondary windings being connected in series in polarity opposed pairs, and indicating means having said series connected secondary windings connected across the input thereof for producing an indication in response to a signal inbalance between the two secondary windings of at least one of said pairs.

2. In combination, a source of drive signals, a network of plural individually actuatable circuit paths, plural resistance means each being connected in a different one of said paths, means selectively applying said signals to one of said circuit paths for developing potential differences across said resistance means connected in said one selected path, indicating means, and means combining the potential differences appearing across each of said resistance means in series with one another across an input to said indicating means to indicate as a function of the combined potential difference amplitude the presence of signals in at least one additional one of said circuit paths.

3. The combination in accordance with claim 2 in which said network comprises first and second selection matrices of coordinate row and column circuits, a plurality of crosspoint loads each interconnecting different row and column circuits in said matrices, and means selectively enabling one of said row circuits and one of said column circuits in each of said matrices to form one of said circuit paths to receive said drive signals from said source, each of said resistance means includes a different resistive impedance in each of said row and column circuits, said coupling means couples potential differences from all of said resistive impedances to said indicating means with the potential differences from said first matrix being in series aiding relationship with respect to one another but in series opposing relationship with respect to potential differences from said second matrix to indicate the presence of signals in at least one additional path of either of said networks.

4. The combination in accordance with claim 2 in which said coupling means includes means applying said potential differences in series aiding relationship to said indicating means, and said indicating means includes amplitude discriminating means adapted to be responsive to only potential differences in excess of the potential difference appearing across said resistance means in the selected one of said circuit paths.

5. The combination in accordance with claim 2 in which said coupling means couples a first group of said potential differences in series aiding relationship with respect to one another but in series opposing relationship with respect to a second group of said potential differences.

6. In a selection circuit including a matrix of row and column circuits interconnected at the matrix intersections thereof by crosspoint load means, a source of drive current pulses coupled to said selection circuit, means selecting one of said row circuits and one of said column circuits to receive drive current pulses for energizing the crosspoint load connected therebetween, plural resistance means each connected in series in a different one of said row or column circuits to couple said drive current pulses thereto, plural transformers each having a primary winding connected across a different one of said resistance means, each of said transformers also having a secondary winding, signal detection means, and means connecting all of said secondary windings in series across the input of said detection means, said secondary windings being poled so that current flow in only said selected row and column circuits produces no net signal to said detection means but current flow in an additional nonselected row or column circuit produces a net signal to said detection means.

7. In combination, a selection matrix of row and column matrix coordinate circuits, a plurality of matrix crosspoint loads, each of said loads being connected between a different combination of one of said row circuits and one of said column circuits, means applying pulses to a selectable one each of said row and column circuits for energizing the one of said crosspoint loads connected therebetween, means selectively enabling said one row and column circuit to conduct said pulses to said one load, a plurality of resistive impedance means each being connected in series in a different one of said coordinate row and column circuits, indicating means, and means coupling the potential differences appearing across each of said impedance means in response to said pulses to said indicating means, said coupling means comprising means offsetting said potential differences against one another for activating said indicating means in response to a coupling means signal indicative of the presence of pulse signals in at least one matrix coordinate circuit in addition to said selected one row and column circuit.

8. In combination, a selection matrix of row and column matrix coordinate circuits, a plurality of matrix crosspoint loads, each of said loads being connected between a difference combination of one of said row and column circuits, means selectively applying pulses to one of said row circuits and one of said column circuits for energizing the one of said crosspoint loads connected therebetween, a plurality of signal-sensitive resistance means each being connected in series in a different one of said coordinate row and column circuits, each of said resistance means having a high resistance in response to signals with amplitudes below a predetermined magnitude that is much smaller than the magnitude of said pulses and having a much lower and substantially constant resistance in response to a range of signal magnitudes above said predetermined magnitude and including the magnitudes of said pulses, indicating means, and means coupling the potential differences appearing across said resistance means in response to said pulses to said indicating means, said coupling means comprising means offsetting said potential differences against one another for activating said indicating means in response to a coupling means signal indicative of the presence of pulse signals in at least one matrix coordinate circuit in addition to said selected row and column circuit.

9. In combination, a selection matrix of row and column matrix coordinate circuit which are interconnected in different combinations, means selectively applying pulses to one of said row circuits and one of said column circuits some of said pulses being positive and others being negative, a plurality of varistors each being connected in series in a different one of said row and column circuits, each of said varistors having a high resistance to signals of either polarity below a predetermined magnitude and a substantially uniform lower resistance to signals of either polarity in a range of magnitudes above said predetermined magnitude, which magnitude is much less than the magnitude of said pulses, indicating means, and means coupling the potential differences appearing across each of said varistors in response to said pulses into a series loop across an input to said indicating means to indicate as a function of the combined potential difference amplitude the presence of pulse signals in at least one matrix coordinate circuit in addition to said selected row and column circuits.

10. The combination in accordance with claim 9 in which said indicating means includes amplification means having an input connected to said coupling means and having an output at which is produced a pulse in response to each input pulse, all output pulses being of a single polarity regardless of the polarity of potential differences received from said coupling means.

11. The combination in accordance with claim 10 in which test means are provided for applying input pulses of either polarity to said amplification means independently of potential differences from said coupling means.

12. In combination, a selection matrix of row and column matrix coordinate circuit which are interconnected in different combinations, means selectively applying pulses to one of said row circuits and one of said column circuits, a plurality of varistors each being connected in series in a different one of said row and column circuits, each of said varistors being adapted to be biased into conduction in response to signals in excess of a predetermined magnitude which is much smaller than the magnitude of said pulses, indicating means, a plurality of transformers each having a primary winding connected across a different one of said varistors, each of said transformers also having a secondary winding, means connecting all of said secondary windings in series across the input of said indicating means, said windings being poled so that said pulses in said selected coordinate circuits only produce insufficient net secondary winding signal to actuate said indicating means but said pulses in a nonselected coordinate circuit varistor produce sufficient net secondary winding signal to actuate said indicating means, and a plurality of resistors each connected across a different one of said secondary windings, the resistance of each resistor being proportioned with respect to the primary-secondary turns ratio of the corresponding transformer to reflect into the primary winding thereof sufficient resistance to develop across the corresponding varistor sufficient potential to bias such varistor into conduction in the presence of any signal in excess of said predetermined magnitude, the sum of the resistances of said resistors being much smaller than the input resistance of said indicating means.

13. In combination, a selection matrix of row and column matrix coordinate circuits which are interconnected in different combinations, means selectively applying pulses to one of said now circuits and to one of said column circuits, plural means coupled respectively to each of said coordinate circuits for developing a potential difference of substantially uniform magnitude in response to any pulse signal in such circuit in excess of a predetermined signal magnitude that is much smaller than the magnitude of said pulses, indicating means, and means combining said potential differences in series at an input to said indicating means with opposite polarities for row and column circuits, respectively, for producing an indicating means output in response to a net potential difference at said input.

14. In combination, a selection matrix of row and column matrix coordinate circuits which are interconnected in different combinations, means selectively applying pulse signals to one of said row circuits and to one of said column circuits, indicating means, means coupling each of said coordinate circuits to said indicating means so that row and column circuit signals are applied to said indicating means with opposite polarities, and signal limiting means connected to said coupling means to limit each coordinate circuit signal applied by said coupling means to a magnitude corresponding to a coordinate circuit signal magnitude much smaller than the magnitude of said pulse signals.

15. In a selection circuit including at least one matrix of row and column circuits interconnected at the matrix intersections thereof by crosspoint load means, means supplying drive current pulses to said selection circuit, means selecting at least one of said row circuits and at least one of said column circuits to receive drive current pulses for energizing the crosspoint load connected therebetween, plural resistance means each connected in series in a different one of said row or column circuits to couple said drive current pulses thereto, plural transformers each having a primary winding connected across a different one of said resistance means, each of said transformers also having a secondary winding.

means connecting all of said secondary windings in series, and signal detection means having the input thereof coupled to said connecting means, said detection means including means inhibiting operation thereof in the absence of current flow in a predetermined minimum number of said resistance means.

References Cited

UNITED STATES PATENTS

| | | | |
|---|---|---|---|
| 2,926,334 | 2/1960 | Abbott | 340—166 XR |
| 3,172,087 | 3/1965 | Durgin | 340—174 |
| 3,337,849 | 8/1967 | Lowry | 340—166 |
| 3,371,315 | 2/1968 | Huffman et al. | 340—147 XR |

OTHER REFERENCES

Saxenmeyer, G. J.: Bit Error Checking and Matching, IBM Technical Disclosure Bulletin, V. 2 (2), August 1959.

BERNARD KONICK, Primary Examiner

G. M. HOFFMAN, Assistant Examiner

U.S. Cl. X.R.

340—174